Jan. 11, 1944.   M. C. TEAGUE ET AL   2,338,827

METHOD OF MAKING REINFORCED RUBBER ARTICLES

Filed Jan. 22, 1942

INVENTOR.
Merwin C. Teague
and Robert R. Sterrett
BY Lester G. Budlong
ATTORNEY

Patented Jan. 11, 1944

2,338,827

UNITED STATES PATENT OFFICE 2,338,827

METHOD OF MAKING REINFORCED RUBBER ARTICLES

Merwyn C. Teague, Ridgewood, N. J., and Robert R. Sterrett, Naugatuck, Conn., assignors to United States Rubber Company, New York, N. Y., a corporation of New Jersey Application January 22, 1942, Serial No. 427,739

3 Claims. (Cl. 18—58)

This invention relates to the production of a rubber article having a reinforced projection, and more particularly to methods of producing a reinforced projection in a rubber article made from an aqueous dispersion of rubber.

It is often desirable, as in the manufacture of rubber appliances which are to be attached to various members, to provide reinforced projections, such as buttons, on the surface thereof. This invention provides a method for integrally including a reinforcement or insert on the exterior surface of a rubber article such as, for example, a bathing cap, gas mask, knee pad, etc. The particular feature of the invention may be practised in the production of latex articles. According to the invention, a latex deposition form or dipping form is provided, with means, for example an extending pin or other retaining element, for temporarily positioning a reinforcing element or insert to be included in the finished article. The reinforcing insert is placed over the retaining element before the dipping or other depositing process starts, and is held in position thereby during the latex-depositing operation. The form with the insert is then subjected to a deposit of latex, preferably by dipping, but other known methods of latex deposition may likewise be employed, for example, such as spraying.

In the case of dipping, the deposition form with the insert is dipped into a latex bath, coagulating steps taking place in well-known manner. For example, a preliminary latex dip may be followed by a dip into a coagulant, for example an acidic bath, and then the form may be again dipped into the latex until a sufficient thickness has been built up to produce the desired article. As the form with the insert is dipped into the latex, the latex surrounds the insert and the rubber article thus formed includes the insert. The latex film is converted into a rubber article in any desired manner.

The coagulated latex film comprising the rubber article may be stripped together with the insert from the form, the insert-retaining element remaining attached to the form. The projection on the rubber article thus produced is substantially surrounded by rubber. The articles thus produced may then be subjected to further drying and vulcanization operations, as desired.

In a preferred embodiment of the invention the relation between the insert-retaining element on the form and the reinforcing element or insert proper before dipping is such that the base of the insert is spaced from the exterior overall surface of the dipping form. With this embodiment, a dipping operation will fill in the gap between the base of the insert and the exterior surface of the form thereby attaining not only a complete rubber cover on the exterior of the insert but also a substantially complete interior covering for the insert. This feature is desirable in the case of head or face-covering articles manufactured by the dipping method, in that no stiff or metallic parts can touch the skin of the wearer.

If desired, one or more preliminary dipping operations may be performed before the reinforcing element is placed in position. In this case, local rubber may be cut away from the insert-retaining element or an interiorly oversized member may be placed over said local rubber portion, and subsequent dips may be made, at the end of which operations the reinforced article may be removed from the form.

A present preferred embodiment of a method for performing the present invention is illustrated in the attached drawing in which.

Figure 1:
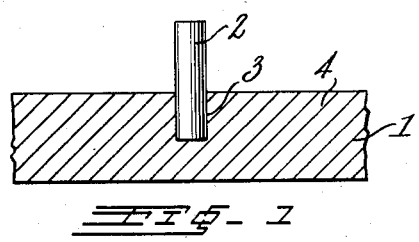
Fig. 1 is a fragmentary cross-sectional view of a portion of a dipping form and an insert-retaining element secured thereto and projecting therefrom.
Figure 2:
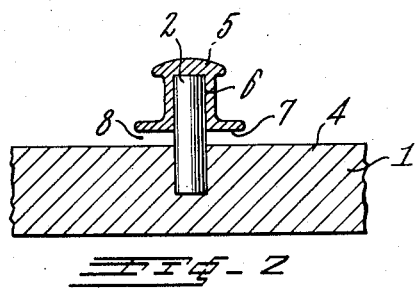
Fig. 2 is a fragmentary cross-section of the prepared intermediate form similar to Fig. 1, but with the reinforcing element or insert in position ready for a dipping operation.

In the drawing, a major deposition form member 1 made of any suitable material usually employed in latex depositing methods, such as wood, aluminum or other metal, or rubber with a halogenated non-adhering surface, is provided with a pin 2 which is permanently secured in a socket 3 and extends outwardly from the exterior surface 4 of the form 1. The projecting pin 2 may be integral with the form 1 if desired. Onto the pin 2 is placed a reinforcing element such as the button 5 which may be of any desired material such as metal, synthetic plastic, or hard rubber which will impart strength and a degree of stiffness. The pin 2 extends into a receptacle 6 within the button 5. If desired, the receptacle 6 may extend entirely through the button. However, the projecting portion of the pin 2 is preferably longer than the depth of the receptacle 6 so that below the base 7 of the button 5 there is a space 8 separating the button from the exterior surface 4 of the form. The temporary relationship between the receptacle 6 and the pin 2 is preferably such that the two parts fit loosely enough to effect easy removal of the finished article with the reinforcing button, but sufficiently tightly to avoid removal or loss of the button during the dipping operations. The space 8 may correspond generally in thickness to the desired ultimate thickness of the major area 9 of the finished article 10.

The deposition form, for example, for the production of a gas mask wherein several harness sections are to be secured at various points around the mask, may be provided around its periphery with a plurality of projections 2 in order to provide the securing buttons. After all of the buttons 5 have been placed in removable position on the pins, latex may be deposited on the form in known manner preferably by dipping the form, with the buttons temporarily secured thereon, into a latex bath. Coagulating or setting operations will take place in known manner and when the desired thickness of the article has been built up, the form 1 is withdrawn from the bath. Thence, it may be subjected to washing and/or drying operations. The article 10 with the insert 6 may be removed from the form before or after vulcanization, as desired.

Figure 3:
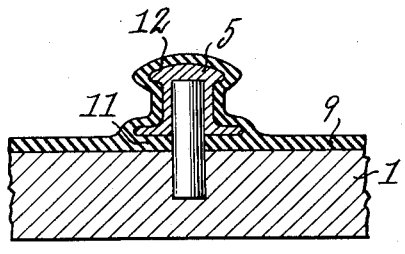
Fig. 3 is a view similar to Figs. 1 and 2 showing a latex or rubber film deposited onto the form, as after a dipping operation or a series thereof.

It is to be noted, as shown in Fig. 3, that an annular portion of rubber 11 substantially covers the under surface of the buttons 5, which are covered on the exterior by a layer of rubber 12. The aperture 13 (Fig. 4) produced on the inside of the rubber article represents the position previously occupied by the base of the projection pin 2.

Figure 4:
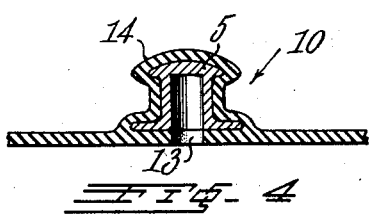
Fig. 4 shows a portion of the finished article, including the insert, after removal from the form.

The over-all button 14 corresponds generally, and with considerable accuracy, to the shape of the insert 5. The reinforced button may, if desired, be formed so that the base of the insert is uncovered, in which case the pin 2 may project from the forming surface a distance equal to or less than the depth of the insert receptacle 6. For most practical purposes, however, the structure shown in Fig. 4 is preferred, for reasons of comfort, as discussed above.

It is to be understood that, while a particular method of production of a latex article on a deposition or dipping form has been shown and described, the invention may likewise be practiced with other known latex dipping or deposition methods.

The term "latex" as used in this specification and the appended claims designates broadly coagulable dispersions of elastic materials including artificial dispersions of rubber or rubber-like materials as well as natural latex, which may be preserved or compounded or otherwise treated if desired, as by vulcanization, and which may be in normal, concentrated, diluted or purified condition produced by methods well known in the art.

While certain present preferred methods of practicing the invention have been described, it will be understood that it may be otherwise practiced as will occur to those skilled in the art within the spirit of the invention and within the scope of the appended claims.

Having thus described our invention, what we claim and desire to protect by Letters Patent is:

1. The method of producing reinforced rubber articles which comprise removably positioning a reinforcing element on a deposition form, maintaining a space between the base of said element and the exterior surface of said form, depositing latex onto the exterior of the form and substantially around said element, converting the latex deposit to a rubber article, and removing said article with said element from the form.

2. The method of producing a rubber article having a reinforcing insert which comprises removably securing a reinforcing insert onto a dipping form with the base of the insert spaced from the surface of the form, dipping said form into a latex composition and depositing it onto the form and substantially around the insert, coagulating the latex to form a rubber article and removing the article with the surrounded insert from the form.

3. The method of producing a rubber article having a reinforcing insert which comprises removably securing a reinforcing insert onto a dipping form in direct contact with a projection thereon so that the base of the insert is spaced from the surface of the form immediately opposite said base, dipping said form into a latex composition and depositing it onto the form and substantially around the insert, coagulating the latex to form a rubber article, and removing the article with the surrounding insert from the form.

MERWYN C. TEAGUE.
ROBERT R. STERRETT.